(12) United States Patent
Kobayashi

(10) Patent No.: US 6,413,622 B1
(45) Date of Patent: Jul. 2, 2002

(54) NON-ASBESTOS FRICTION MATERIALS

(75) Inventor: Mitsuru Kobayashi, Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/510,198

(22) Filed: Feb. 22, 2000

(30) Foreign Application Priority Data

Feb. 22, 1999 (JP) .......................................... 11-042504

(51) Int. Cl.⁷ .............................................. B32B 15/04
(52) U.S. Cl. .................... 428/293.1; 428/323; 428/328; 428/333; 428/344; 428/372; 106/36
(58) Field of Search .......................... 428/292.1, 293.1, 428/323, 328, 332, 333, 337, 344, 372; 106/36

(56) References Cited

U.S. PATENT DOCUMENTS

| | | | | |
|---|---|---|---|---|
| 4,145,223 A | * | 3/1979 | Iwata | .......................... 106/36 |
| 4,777,193 A | * | 10/1988 | Kani | .......................... 523/153 |

FOREIGN PATENT DOCUMENTS

| | | |
|---|---|---|
| DE | 3727809 A1 | 3/1988 |
| DE | 3730430 A1 | 3/1988 |
| FR | 2372129 | 6/1978 |
| GB | 2195944 A | 4/1988 |
| GB | 2196977 A | 5/1988 |
| GB | 2268502 A | 1/1994 |

* cited by examiner

*Primary Examiner*—Merrick Dixon
(74) *Attorney, Agent, or Firm*—Birch, Stewart, Kolasch & Birch, LLP

(57) ABSTRACT

A non-asbestos friction material is made by molding and curing a composition comprising a fibrous base, an inorganic filler, an organic filler and a binder. The inorganic filler, typically zirconium silicate, has a 90% particle size of 0.1 to 8 μm, a Mohs hardness of 6 to 8, and accounts for 0.1 to 10% by volume of the overall composition. The friction material is useful as brake linings and has a high braking effectiveness in normal use, a small speed spread, low change over time in braking effectiveness, and can prevent morning effect and jerky low-speed braking.

9 Claims, No Drawings

NON-ASBESTOS FRICTION MATERIALS

The present invention relates to non-asbestos friction materials made by molding and curing compositions comprising a fibrous base, an inorganic filler, an organic filler and a binder. More specifically, it relates to non-asbestos friction materials which can prevent undesirable jerkiness in low-speed braking, and are thus highly suitable as friction materials for use in large vehicles such as buses and trucks.

BACKGROUND OF THE INVENTION

A sharp increase in braking performance or effectiveness at low speed, especially in large vehicles such as buses and trucks, results in jerky low-speed braking characterized by sudden stopping of the vehicle accompanied by large, lurching movements. This makes for an uncomfortable ride, and sometimes even causes passenger injuries due to falls inside the vehicle. Hence, there exists a need for a way to prevent such jerkiness in low-speed braking.

At the same time, regulatory in Japan has led to an increased demand for higher braking effectiveness. The following improvements in friction materials have been proposed as ways to achieve better effectiveness.

(1) Add a large amount of metal powder to the friction material.
(2) Include a large amount of glass fibers in the friction material (e.g., at least 10% by volume, based on the overall composition).
(3) Increase the average particle size of the abrasive used in the friction material and suitably adjust the content of the abrasive. A typical example is the use of zirconium silicate or magnesium oxide having an average particle size of at least 10 $\mu$m.

However, each of these prior-art methods for increasing braking effectiveness has a number of associated problems. For instance, the first approach, according to which a large amount of metal powder is added to the friction material, causes "metal catch," resulting in such undesirable effects as scoring of the brake drum and uneven braking action which causes the vehicle to pull to one side during braking.

The second approach, which involves adding at least 10% by weight of glass fibers to the friction material, does improve braking effectiveness. However, this advantage is offset by an increase in the "speed spread," defined herein as the absolute value of the difference between effectiveness at 50 km/h and effectiveness at 100 km/h, and also larger and undesirable changes over time in both the braking effectiveness and the speed spread.

In the third approach mentioned above, an abrasive such as zirconium silicate or magnesium oxide having an average particle size of at least 10 $\mu$m is included in the friction material. This solution is indeed effective for enhancing braking effectiveness, yet it too has a number of shortcomings. Undesirable results include a larger speed spread, decreased effectiveness at high speed, and large and undesirable changes over time in both the speed spread and braking effectiveness. In addition, the abrasive scores the brake drum and is a cause of jerkiness during low-speed braking.

Moreover, owing to the large content of the above added components, these friction materials (1) to (3) cause a higher than necessary degree of wear on the mating surface (e.g., drum or disc surface), shortening the brake life.

Hence, prior-art friction materials all have significant drawbacks. Not only do they fall short of the requirements for such materials, they are unable to prevent undesirable jerkiness during low-speed braking.

SUMMARY OF THE INVENTION

It is therefore an object of the present invention to provide a non-asbestos friction material which has a high braking effectiveness in ordinary use, a small speed spread, and minimal change over time in both the braking effectiveness and speed spread, does not give rise to a morning effect, and can prevent jerky movement during low-speed braking. "Morning effect," as used herein, refers to an increase in the braking effectiveness from the initial effectiveness during cold-temperature operation.

We have found that, unlike earlier attempts to enhance braking effectiveness, adding to the friction material composition a specific amount of an inorganic filler having a high hardness and small particle size,.and preferably adding also a smaller than customary amount of chopped glass strand has the surprising and unanticipated effect of providing an outstanding non-asbestos friction material which is endowed with a good braking effectiveness under normal use yet does not cause undesirable jerkiness during low-speed braking.

That is, we have discovered that the incorporation, in a non-asbestos friction material made by molding and curing a composition comprising a fibrous base, an inorganic filler, an organic filler and a binder, of 0.1 to 10% by volume, based on the overall composition, of an inorganic filler having a 90% particle size of 0.1 to 8 $\mu$m (as opposed to the particle size of at least 10 $\mu$m typical of the prior art) and a Mohs hardness of 6 to 8, and preferably the further incorporation of the lower than conventional amount of 1 to 6% by volume of chopped glass strand, based on the overall composition, elicits synergistic effects between these constituents and other constituents of the friction material. By virtue of these effects, there can be obtained outstanding non-asbestos friction materials which have a high braking effectiveness in normal use (generally about 50 km/h), a small speed spread, and an undiminished braking effectiveness at high speeds, undergo minimal change over time in effectiveness and speed spread, do not give rise to a morning effect, can prevent jerkiness during low-speed braking, cause minimal drum surface roughness and drum wear depth following continuous use, and have outstanding durability and a longer service life.

The reasons for the excellent properties of the inventive friction material are not well understood. However, a likely explanation is that molding the friction material composition in a state where the inorganic filler having a high hardness and a specific 90% particle size is uniformly blended with preferably a small amount of chopped glass strand allows each ingredient to exhibit its full capabilities. This makes it possible to achieve a friction material which, unlike prior-art friction materials that contain only an abrasive having a large average particle size or have a high glass fiber content, has a high braking effectiveness in normal use, and also has a small speed spread, does not undergo a decline in braking effectiveness at high speeds, experiences minimal change in the effectiveness and speed spread over time, can prevent undesirable jerkiness during low-speed braking, causes minimal drum surface roughness and drum wear depth following continuous use, and has excellent durability and a longer service life.

Accordingly, the present invention provides a non-asbestos friction material made by molding and curing a composition comprising a fibrous base, an inorganic filler, an organic filler and a binder, wherein the inorganic filler has a 90% particle size of 0.1 to 8 $\mu$m, a Mohs hardness of 6 to 8, and accounts for 0.1 to 10% by volume of the overall composition.

The invention additionally provides a non-asbestos friction material made by molding and curing a composition comprising a fibrous base, an inorganic filler, an organic filler and a binder, which friction material has a difference ratio between the braking effectiveness at 5 km/h (TP1) and the braking effectiveness at 30 km/h (TP2), as determined by low-temperature low-speed braking tests in accordance with Japan Automobile Technology Association standard JASO C407-87 and expressed as (TP1−TP2)/TP1×100, of at most 40%.

DETAILED DESCRIPTION OF THE INVENTION

The non-asbestos friction material of the invention can be made by molding and curing a composition composed primarily of a fibrous base, an inorganic filler, an organic filler and a binder. However, to achieve the objects of the invention, it is critical that, of these components, the amount and type of inorganic filler be selected such that a specific proportion of an inorganic filler having a specific Mohs hardness and a specific 90% particle size is formulated within the composition. Moreover, it is recommended that the composition include a lower than conventional amount of chopped glass strand as the fibrous base.

The inorganic filler must have a 90% particle size of 0.1 to 8 $\mu$m and a Mohs hardness of 6 to 8, and must account for 0.1 to 10% by volume of the overall friction material composition. The 90% particle size is preferably 0.3 to 6 $\mu$m, more preferably 0.5 to 4 $\mu$m, and most preferably 0.5 to 3 $\mu$m. The Mohs hardness is preferably 7 to 8. The content of inorganic filler is preferably 3 to 9% by volume and most preferably 4 to 8% by volume, based on the overall composition. A friction material made of a composition in which the Inorganic filler has a 90% particle size, a Mohs hardness or a content below these respective ranges is unable to achieve an increased braking effectiveness. On the other hand, the use of inorganic filler having a 90% particle size, a Mohs hardness or a content greater than the above respective ranges results in a friction material that causes jerkiness during low-speed braking. The objects and advantages of the invention cannot be achieved in either of these cases.

The term "90% particle size," as used herein, refers to the particle size at 90% of the cumulative particle size distribution.

The shape of the inorganic filler particles is not critical although a spherical or nearly spherical shape is preferred. The particles may be surface treated if necessary.

Illustrative examples of such inorganic fillers having an average particle size and a Mohs hardness within the indicated ranges include magnesia, zirconium oxide, zirconium sulfide, zirconium silicate, α-quartz (Mohs hardness, 7) and chromium oxide. These may be used alone or as combinations of two or more thereof. The preferred inorganic filler is zirconium silicate (Mohs hardness, 7.5).

In addition to inorganic filler having the above-indicated average particle size and Mohs hardness, the friction material of the invention may contain also other inorganic fillers commonly used in friction materials. Illustrative examples include molybdenum disulfide, calcium carbonate, barium sulfate, calcium hydroxide, calcium fluoride, talc, iron oxide, mica, iron sulfide, metal powders and vermiculite. Such other inorganic fillers may be used alone or as combinations of two or more thereof. The content of these other inorganic fillers in the friction material composition is preferably 0.1 to 70% by volume, more preferably 3 to 50% by volume, and most preferably 5 to 30% by volume.

Along with the inorganic filler having the specific 90% particle size and Mohs hardness noted above, the friction material of the invention preferably includes also a specific amount of glass chopped strand as the fibrous base.

It is preferred that the glass chopped strand have a fiber length of 2 to 5 mm, especially 2.5 to 3.5 mm, a fiber diameter of 5 to 12 $\mu$m, especially 7 to 11 $\mu$m, and a number of fibers per strand of 50 to 500, especially 100 to 400.

The content of glass chopped strand is preferably 1 to 6% by volume, more preferably 2 to 6% by volume, and most preferably 2 to 4% by volume, based on the overall composition. The addition of too little glass chopped strand results in low braking effectiveness and poor reinforcing effects, leading to cracking and fissuring. On the other hand, too much chopped strand increases the speed spread.

In addition to glass chopped strand, the friction material of the invention may contain also other fibrous bases commonly used in friction materials. Illustrative examples include inorganic fibers such as metal fibers (e.g., iron, copper, brass, bronze, aluminum), ceramic fibers, potassium titanate fibers, carbon fibers, rock wool, wollastonite, sepiolite, attapulgite and artificial mineral fibers; and organic fibers such as aramid fibers, cellulose pulp, aramid pulp and acrylic fibers. Any one or combinations of two or more thereof may be used. Such fibrous bases may be used in the form of staple fibers or powder. The content of these other fibrous bases is preferably 5 to 30% by volume, and more preferably 5 to 15% by volume, based on the overall friction material composition.

Examples of suitable organic fillers that may be used in the invention include cashew dust, reclaimed dire dust, rubber dust, graphite, nitrile rubber dust (vulcanizate) and acrylic rubber dust (vulcanizate). These may be used alone or as combinations of two or more thereof. The organic filler is added in an amount of preferably 0.5 to 60% by volume, and especially 5 to 35% by volume, based on the overall friction material composition.

The binder used in the composition may be any known binder commonly used in friction materials. Suitable examples include phenolic resin, melamine resin, epoxy resin, various rubber-modified phenolic resins, nitrile rubber, acrylic rubber and silicone rubber. These may be used alone or as combinations of two or more thereof. The binder is added in an amount of preferably 7 to 40% by volume, and especially 10 to 25% by volume.

The method of making the non-asbestos friction material of the invention involves first uniformly blending the above components in a suitable mixer such as a Henschel mixer, Redige mixer or Eirich mixer so as to give a molding powder, and preforming the powder in a mold. The preform is then molded at a temperature of 130 to 200° C. and a pressure of 100 to 400 kg/cm$^2$ for a period of 2 to 15 minutes.

The resulting molded article is postcured by heat-treating at 140 to 250° C. for 2 to 48 hours, then cut, machined, ground and otherwise processed as needed to the required dimensions, giving the finished article.

In one embodiment of the invention, the friction material has a braking effectiveness TP1 at 5 km/h and a braking effectiveness TP2 at 30 km/h, as determined by low-temperature low-speed braking performance tests in accordance with Japan Automobile Technology Association standard JASO C407-87 (Dynamometer Test Methods for Truck and Bus Braking Equipment). The difference ratio between the braking effectiveness TP1 at 5 km/h and the braking effectiveness TP2 at 30 km/h, expressed as (TP1−TP2)/

TP1×100, must be at most 40%, preferably at most 30%, more preferably at most 20%, and most preferably at most 15%. The lower limit in the difference ratio is not critical although a value of at least 0% is preferred. Too large a difference ratio may result in jerky low-speed braking, in which the braking effectiveness rises suddenly during brake operation at low speeds.

Typically, the low-temperature low-speed braking performance tests according to JASO C407-87 are conducted at a temperature of about 10° C. The difference ratio (TP1−TP2)/TP1×100 as measured at 10° C. is preferably at most 20%, and most preferably from 0 to 15%. The difference ratio (TP1×TP2)/TP1×100 as measured at 100° C., which serves as the basis of comparison, is preferably at most 10%, and especially 0 to 7%.

In the low-temperature low-speed braking performance tests according to JASO C407-87, the braking torque T and brake fluid pressure P are measured at a simulated empty vehicle inertia and under four sets of conditions: a pre-braking brake temperature of 10° C. or 100° C. (basis of comparison) paired with an initial braking speed of 5 km/h or 30 km/h. These results are used to calculate the braking effectiveness, defined here as T/P, which is used in turn to calculate the rise in braking effectiveness at low speeds (i.e., the difference in effectiveness, given by T/P at 5 km/h−T/P at 30 km/h) and the difference ratio in effectiveness. The brake temperature was measured with a temperature sensor mounted on the brake assembly.

Preferably, the friction materials of the invention also have a change over time in speed spread, represented by the formula shown below, from a first (before bedding-in) effectiveness test to a final (fifth) effectiveness test in normal-use braking performance tests conducted at a simulated constant load inertia in accordance with JASO C407-87 (Dynamometer Test Methods for Truck and Bus Braking Equipment) of from 90 to 150%, and especially 90 to 120%. In addition, the change over time in braking effectiveness, represented by the formula shown below, is preferably 90 to 110%, especially 95 to 105%, at 50 km/h, and preferably 90 to 105%, especially 97 to 103%, at 100 km/h.

Percent change over time in speed spread=(speed spread in fifth test)/(speed spread in first test)×100

Percent change over time in effectiveness=(T/P at 50 or 100 km/h in fifth test)/(T/P at 50 or 100 km/h in first test)×100

After the first (before bedding-in) to final (fifth) effectiveness tests in normal-use braking performance tests conducted at a constant load inertia in accordance with JASO C407-87, the drum surface roughness, expressed as the average for ten points (RzD) in the roughness component in accordance with German standard DIN-4769, is preferably not more than 15 $\mu$m, more preferably not more than 10 $\mu$m, and most preferably from 1 to 7 $\mu$m. The drum wear depth, expressed as the average for ten points in the depth of wear from the surface of a new drum, is preferably not more than 20 $\mu$m, more preferably not more than 15 $\mu$m, and most preferably from 5 to 13 $\mu$m.

In constant load inertia normal-use braking performance tests according to JASO C407-87, the brake lining is mounted on a large truck rear wheel brake assembly. Using a brake dynamometer, the braking torque T and the brake fluid pressure P are measured by carrying out braking performance tests from a first (before bedding-in) to a final (fifth) effectiveness test under a simulated constant load (gross vehicle weight, 20 metric tons) in accordance with JASO C407-87. The resulting data are used to calculate the braking effectiveness T/P.

Using the friction materials of the invention, an automotive brake shoe assembly may be produced by placing the finished article on a steel or cast iron brake shoe plate that has been cleaned, surface treated and coated with an adhesive. The brake shoe and the finished article are then held together in this state under pressure and bonded by the application of heat. A brake shoe assembly for a bus or truck may be produced by riveting the finished article to a steel or cast iron brake shoe plate that has been cleaned and surface treated.

The non-asbestos friction materials of the invention are highly suitable for use in automobiles. Particularly when the friction materials are employed for large vehicles such as buses and trucks, the jerkiness during low-speed braking that has hitherto been a problem does not arise. The friction materials of the invention also lend themselves well to use in related applications, such as disc pads, brake shoes and brake linings in disc brakes and drum brakes.

EXAMPLE

Examples of the invention and comparative examples are given below by way of illustration, and are not intended to limit the invention.

Examples 1-4 and Comparative Examples 1-4

The friction material compositions shown in Table 1 were formulated, then uniformly blended in a Redige mixer and preformed in a pressure mold under a pressure of 100 kg/cm$^2$ for 10 minutes. Each preform was molded for the desired length of time at a temperature and pressure of 145° C. and 180 kg/cm$^2$, then postcured by 5 hours of heat treatment at 180° C., yielding rear wheel brake linings for large trucks in each of the eight examples.

TABLE 1

|  | Ex 1 | Ex 2 | Ex 3 | Ex 4 | CE 1 | CE 2 | CE 3 | CE 4 |
| --- | --- | --- | --- | --- | --- | --- | --- | --- |
| Aramid fibers | 10 | 10 | 10 | 10 | 10 | 10 | 10 | 10 |
| Phenolic resin | 23 | 23 | 23 | 23 | 23 | 23 | 23 | 23 |
| Cashew dust | 33 | 33 | 33 | 33 | 33 | 33 | 33 | 33 |
| Calcium carbonate | 7 | 10 | 9 | 3 | 7 | 7 | 5 | — |
| Barium sulfate | 10 | 10 | 10 | 10 | 10 | 10 | 10 | 9 |
| Graphite | 7 | 7 | 7 | 7 | 7 | 7 | 7 | 7 |
| Common zirconium silicate[1] | — | — | — | — | 8 | 4 | 4 | 8 |
| Fine zirconium silicate[2] | 8 | 4 | 4 | 8 | — | — | — | — |

TABLE 1-continued

|  | Ex 1 | Ex 2 | Ex 3 | Ex 4 | CE 1 | CE 2 | CE 3 | CE 4 |
|---|---|---|---|---|---|---|---|---|
| Glass fibers[3] | 2 | 3 | 4 | 6 | 2 | 6 | 8 | 10 |
| Total (% by volume) | 100 | 100 | 100 | 100 | 100 | 100 | 100 | 100 |

[1] General-purpose zirconium silicate: Mohs hardness; 7.5; 90% particle size, 10 μm.
[2] Fine zirconium silicate: Mohs hardness, 7.5; 90% particle size, 1.5 μm.
[3] Glass chopped strand: fiber length, 3 mm; fiber diameter, 9 μm; fibers per strand, 100.

The brake linings obtained in the examples were subjected to two dynamometer tests conducted in accordance with JASO C407-87: (1) a simulated empty vehicle inertia low-temperature low-speed braking performance test, and (2) a simulated constant load inertia normal-use braking performance test.

(1) Low-Temperature, Low-Speed Braking Performance Test

The braking torque T and brake fluid pressure P were measured in accordance with JASO C407-87 at a simulated empty vehicle inertia and under four sets of conditions: a pre-braking brake temperature of 10° C. or 100° C. paired with an initial braking speed of 5 km/h or 30 km/h. These results were used to calculate the braking effectiveness T/P.

The braking effectiveness data were then used to evaluate the degree of rise in low-speed braking effectiveness at various temperatures; namely, T/P at 5 km/h (TP1)–T/P at 30 km/h (TP2). In addition, the difference ratio in effectiveness, (TP1−TP2)/TP1×100, was computed. The results are shown in Table 2.

(2) Normal-Use Braking Performance Test at Simulated Constant Load Inertia

The brake linings fabricated in Examples 1 to 4 and Comparative Examples 1 to 4 were each in turn mounted on a large truck rear wheel brake assembly. Braking performance tests from a first (before bedding-in) to a final (fifth) effectiveness test according to JASO C407-87 were carried out under a simulated constant load (GVW=20 t) with a brake dynamometer. The braking torque T and brake fluid pressure P measured in the tests were used to compute the braking effectiveness T/P. The drum surface roughness and drum wear depth following tests 1 to 5 were measured as described below. The results are shown in Table 3.

Drum Surface Roughness

Expressed as the average for 10 points (RzD) of the roughness component as determined in accordance with the German standard DIN-4769.

TABLE 2

|  | Ex 1 | Ex 2 | Ex 3 | Ex 4 | CE 1 | CE 2 | CE 3 | CE 4 |
|---|---|---|---|---|---|---|---|---|
| T/P at 5 km/h (TP1) at 10° C. | 8.1 | 7.8 | 7.8 | 8.2 | 17.8 | 15.4 | 16.2 | 18.7 |
| T/P at 30 km/h (TP2) at 10° C. | 7.2 | 7.1 | 7.2 | 7.3 | 7.6 | 6.3 | 6.4 | 7.7 |
| Difference in effectiveness (TP1 − TP2) at 10° C. | 0.9 | 0.7 | 0.6 | 0.9 | 10.2 | 9.1 | 9.8 | 11.0 |
| Difference ratio in effectiveness, (TP1 − TP2)/TP1 × 100, at 10° C. | 11.1 | 9.0 | 7.7 | 11 | 57.3 | 59.1 | 60.5 | 58.8 |
| T/P at 5 km/h (TP1) at 100° C. | 7.5 | 7.4 | 7.3 | 7.5 | 14.7 | 13.4 | 14.5 | 15.2 |
| T/P at 30 km/h (TP2) at 100° C. | 7.2 | 7.0 | 7.1 | 7.3 | 7.9 | 5.8 | 6.0 | 8.2 |
| Difference in effectiveness (TP1 − TP2) at 100° C. | 0.3 | 0.4 | 0.2 | 0.2 | 6.8 | 7.6 | 8.5 | 7.0 |
| Difference ratio in effectiveness, (TP1 − TP2)/TP1 × 100, at 100° C. | 4.0 | 5.4 | 2.7 | 2.7 | 46.3 | 56.7 | 58.6 | 46.1 |

The results in Table 2 show that Comparative Examples 1 to 4 gave rise to jerkiness during low-speed braking because braking effectiveness at 5 km/h increased substantially over that at 30 km/h. Moreover, the difference in braking effectiveness between 10° C. and 100° C. was large (a morning effect occurred). Also, the difference ratio in effectiveness in these comparative examples was very large, ranging from 57.3 to 60.5% at 10° C. and from 46.1 to 58.6% at 100° C.

By contrast, Examples 1 to 4 according to the invention prevent jerky low-speed braking because the increase in braking effectiveness at low speed (5 km/h) was small. The difference in braking effectiveness between 10° C. and 100° C. was small (no morning effect). Moreover, the difference ratio in effectiveness was very small, ranging from 7.7 to 11.1% at 10° C. and from 2.7 to 5.4% at 100° C.

Drum Wear Depth

Expressed as the average for 10 points of the depth of wear from the surface of a new drum.

Next, the speed spread, defined above as the absolute value of the difference between the braking effectiveness at 50 km/h and the braking effectiveness at 100 km/h, was computed from the resulting T/P values. The change over time in the speed spread and the change over time in braking effectiveness were computed from the formulas given below.

The results are shown in Table 3.

Percent change over time in speed spread=(speed spread in fifth test)/(speed spread in first test)×100

Percent change over time in effectiveness=(T/P at 50 or 100 km/h in fifth test)/(T/P at 50 or 100 km/h in first test)×100

TABLE 3

|  | Ex 1 | Ex 2 | Ex 3 | Ex 4 | CE 1 | CE 2 | CE 3 | CE 4 |
|---|---|---|---|---|---|---|---|---|
| T/P at 50 km/h in first test | 8.9 | 8.7 | 8.8 | 9.1 | 9.0 | 8.7 | 8.9 | 9.3 |
| T/P at 100 km/h in first test | 6.8 | 6.4 | 6.3 | 7.0 | 4.6 | 4.7 | 4.8 | 4.8 |
| T/P at 50 km/h in fifth test | 8.8 | 8.5 | 8.7 | 9.0 | 14.2 | 13.2 | 13.0 | 14.6 |
| T/P at 100 km/h in fifth test | 6.6 | 6.2 | 6.3 | 6.9 | 4.8 | 4.9 | 4.5 | 4.6 |
| Speed spread in first test (absolute value of 100 km/h − 50 km/h) | 2.1 | 2.3 | 2.5 | 2.1 | 4.4 | 4.0 | 4.1 | 4.5 |
| Speed spread in fifth test (absolute value of 100 km/h − 50 km/h) | 2.2 | 2.3 | 2.4 | 2.1 | 9.4 | 8.3 | 8.5 | 10.0 |
| Change over time in speed spread (%) | 105 | 100 | 96 | 100 | 214 | 208 | 207 | 222 |
| Change over time at 50 km/h (%) | 99 | 98 | 99 | 99 | 124 | 151 | 146 | 157 |
| Change over time at 100 km/h (%) | 97 | 97 | 100 | 99 | 104 | 104 | 94 | 96 |
| Drum surface roughness ($\mu$m) | 7.1 | 6.3 | 6.5 | 6.8 | 28.2 | 25.4 | 26.3 | 31.6 |
| Drum wear depth ($\mu$m) | 11 | 9 | 10 | 12 | 53 | 47 | 50 | 85 |

As is apparent from the results in Table 3, in each of the comparative examples, the speed spread was large, the braking effectiveness decreased considerably at high speed (100 km/h), the change over time in the speed spread was large, the change over time in braking effectiveness was large (particularly at 50 km/h), and drum wear was substantial.

By contrast, in Examples 1 to 4 according to the invention, the braking effectiveness under normal use (50 km/h) was high, the speed spread was small, braking effectiveness at high speed underwent only a small decline, the change over time in the speed spread was small, the change over time in braking effectiveness was small, and drum wear was low.

The non-asbestos friction materials of the invention thus have the following outstanding and unprecedented performance characteristics.

(1) No morning effect. That is, the difference in braking effectiveness between 100° C. and 10° C. is small. In particular, a rise in braking effectiveness during the morning in cold winter weather can be prevented.

(2) Difference in braking effectiveness at 5 km/h and 30 km/h is small. Hence, the jerkiness during low-speed braking that is caused by a sharp increase in braking effectiveness at low speeds does not arise.

(3) Small speed spread. The absolute value for the difference between the braking effectiveness at 100 km/h and the braking effectiveness at 50 km/h is small, resulting in less of a decline in braking effectiveness at high speed.

(4) Changes over time in braking effectiveness and speed spread are both small.

(5) Drum surface roughness and drum wear depth following continuous use are both small, resulting in excellent durability and a long service life.

Because the friction materials of the invention do not cause jerkiness during low-speed braking, they are highly suitable for use on large vehicles such as buses and trucks.

Japanese Patent Application No. 11-042504 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A non-asbestos friction material made by molding and curing a composition comprising a fibrous base, an inorganic filler having a 90% particle size of 0.1 to 8 $\mu$m, an organic filler, and a binder, wherein the inorganic filler has a Mohs hardness of 6 to 8 and accounts for 0.1 to 10% by volume of the overall composition.

2. The non-asbestos friction material of claim 1, wherein the inorganic filler is selected from the group consisting of magnesia, zirconium oxide, zirconium sulfide, zirconium silicate, a-quartz, chromium oxide and mixtures thereof.

3. The non-asbestos friction material of claim 1, wherein the fibrous base includes chopped glass strand in an amount which accounts for 1 to 6% by volume of the overall composition.

4. The friction material of claim 1, wherein the inorganic filler has a 90% particle size of 0.3 to 6 $\mu$m.

5. The friction material of claim 1, wherein the inorganic filler has a 90% particle size of 0.5 to 4 $\mu$m.

6. The friction material of claim 1, wherein the inorganic filler has a 90% particle size of 0.5 to 3 $\mu$m.

7. A non-asbestos friction material made by molding and curing a composition comprising a fibrous base, an inorganic filler, an organic filler and a binder, which friction material has a braking effectiveness TP1 at 5 km/h and a braking effectiveness TP2 at 30 km/h, as determined by low-temperature low-speed braking performance tests in accordance with Japan Automobile Technology Association standard JASO C407-87, the difference ratio between the braking effectiveness TP1 and TP2, expressed as (TP1−TP2)/TP1×100, being at most 40%.

8. The non-asbestos friction material of claim 7, wherein the difference ratio (TP1−TP2)/TP1×100 is at most 30% as measured at 10° C.

9. The non-asbestos friction material of claim 7, wherein the difference ratio (TP1−TP2)/TP1×100 is at most 20% as measured at 100° C.

* * * * *